| United States Patent Office | 3,436,150
Patented Apr. 1, 1969 |
|---|---|

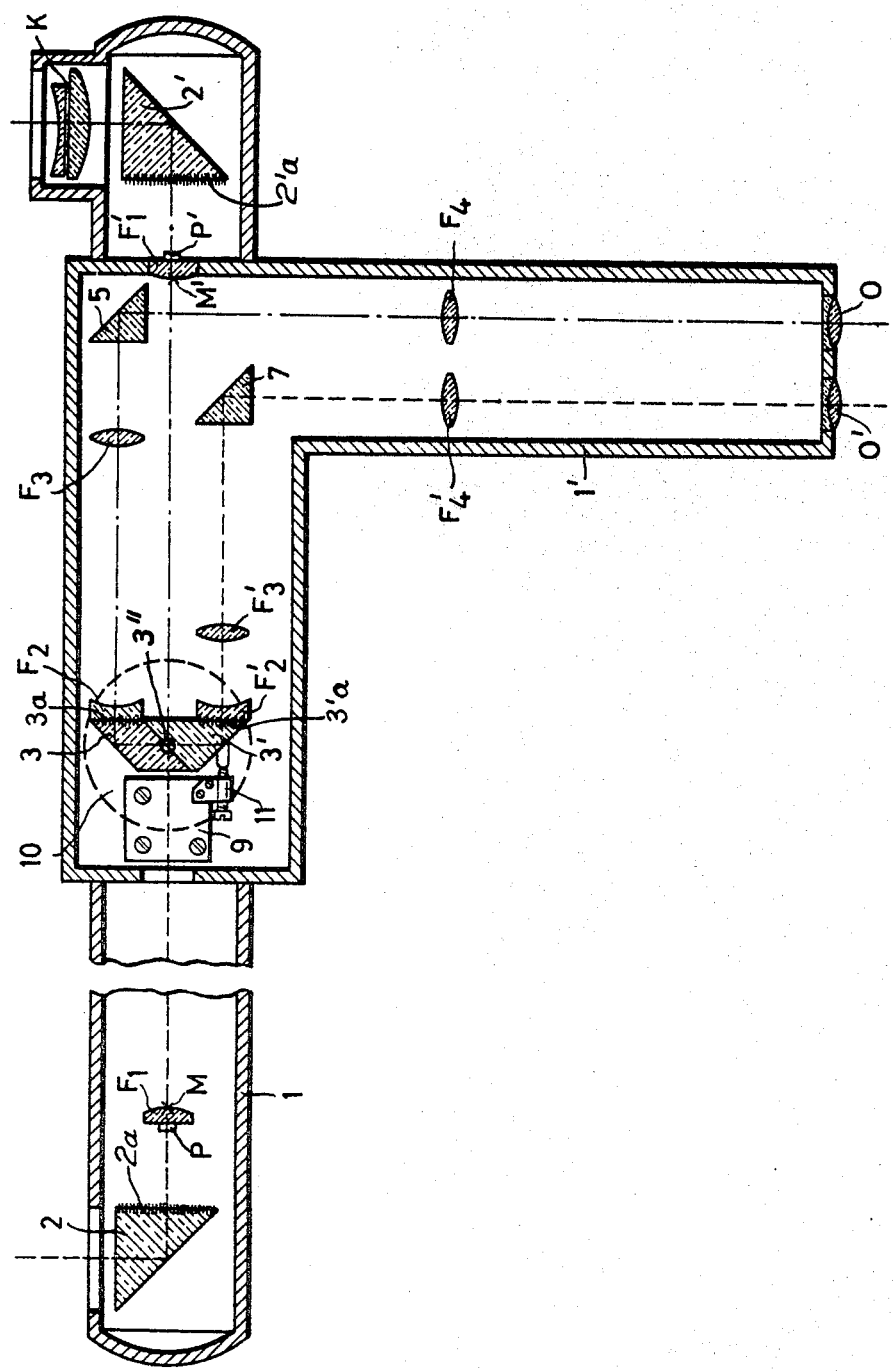

3,436,150
OPTICAL RANGEFINDER DEVICE INCLUDING MEANS FOR ADJUSTING THE LEAD ANGLE
Norbert Gunther, Aalen, Otto Schreiber, Heidenheim (Brenz), Wilhelm Rubl, Aalen, and Otto Griebisch, Oberkochen, Germany, assignors to Carl Zeiss-Stiftung, doing business as Carl Zeiss, Heidenheim (Brenz), Wurttemberg, Germany, a corporation of Germany
Filed June 30, 1965, Ser. No. 468,528
Claims priority, application Germany, June 30, 1964,
Z 9,302
Int. Cl. G01c 3/14
U.S. Cl. 356—12        2 Claims

ABSTRACT OF THE DISCLOSURE

Optical rangefinder provided with a reflection system for the adjustment of a lead angle. The rangefinder includes two telescope systems each of which is provided with an eyepiece and an objective lens, each of said objective lenses having a mark fixed thereon. The reflection prism system is pivotally arranged between said objective lenses. It serves for altering the target line in lateral direction and for reflecting the light beam from said marks. A rotative adjustment of said reflection prism system effects an adjustment of the lead angle.

---

The invention relates to an optical rangefinder device with fixed markings which permit an adjustment of the device independently of topographical and weather conditions.

The employment of this type of rangefinder in connection with ballistic calculating devices requires the adjustment of a lead angle, which may be determined by the self-motivated movement of the sighted object, wind influence or the rifling of the projectile.

In accordance with an object of the invention the adjustment of such a lead angle is effected by a device which is provided with a reflection prism system which is pivotally adjustable about predetermined angular distances and through which the target line is altered in lateral direction. Within the field of vision of the observer the images of the fixed marks appearing in the topography travel laterally during the adjustment.

According to another object of the invention the axis of rotation of this pivotally mounted prism system projects from the housing of the rangefinder and is operatively connected with a micrometer-knob having a dial thereon from which the size of the angle of horizontal swing may be read. This rotative adjustment of the prism system may also be controlled in simple manner by a servo-drive of a calculating device.

The inner adjustment of the device is not affected by this procedure.

The accompanying drawing illustrates diagrammatically and by way of example, an asymmetrically constructed rangefinder device according to the invention:

The longitudinal housing 1 with an observation tube 1' extending at a right angle thereto has mounted therein a binocular telescope firstly with an afocal system $F_1$, $F_2$, an objective $F_3$, a deflecting prism 5, a reversing system $F_4$ and an eyepiece O, and secondly with another afocal system $F'_1$ and $F'_2$, an objective $F'_3$, a reflecting prism 7, a reversing system $F'_4$ and an eyepiece O', and furthermore a reflection prism system comprising a prism combination composed of an orthorhombic prism 3 cemented to a rectangular prism 3'. Each prism 3 and 3' is provided with a partly transparent mirror $3a$ and $3a'$ respectively. The objectives $F_1$ and $F'_1$ are arranged at a fixed distance from one another and carry marks M and M', which may be illuminated by small illumination prisms P and P' disposed on the other objective sides and their images, upon utilization as stereoscopic measuring device are combined to form a stereoscopic picture in the topography. Upon employment of the device as coincidence rangefinder the images of the marks M and M' are brought by the adjusting procedure in the image plane of the eyepiece O' into coincidence with one another. The objectives $F_2$ and $F'_2$ comprise dispersion lenses which are cemented to the vertically positioned partly transparent mirrors $3a$ and $3a'$ directed toward the objectives $F_3$ and $F'_3$ respectively.

The beam of light coming from the target and introduced by the rectangular deflecting prism 2 into the left hand end of the housing 1 passes through the objective $F_1$, and then is twice reflected by the orthorhombic prism 3 of the pivotally mounted prism combination 3, 3', then passes through the objectives $F_2$ and $F_3$ and by the rectangular prism 5 is reflected into the reversing system F and directed into the eyepiece O. The beam of light entering the right hand end of the device passes first through an optical measuring wedge K and then is reflected by the rectangular prism 2' into the objective $F'_1$, then is twice reflected by the rectangular prism 3' of the pivotally mounted prism combination 3, 3' and reaches through the objectives $F'_2$ and $F'_3$ the rectangular reflecting prism 7 and then the reversing system $F'_4$ to be directed into the eyepiece O'. The device operates accordingly as a stereoscopic rangefinder, in whose field of vision the images are combined to a stereoscopic picture. The partly transparent mirrors $3a$ and $3'a$ are arranged at a location which is spaced from the lenses $F_1$ and $F'_1$ respectively, rearwardly a distance equal to one half of the focal length of the lenses $F_1$ and $F'_1$. The mirrors $2a$ and $2'a$ on the prisms 2 and 2' which face the lenses $F_1$ and $F'_1$, respectively, are also partly transparent. The prisms P and P' are cemented to the outer faces of the lenses $F_1$ and $F'_1$, respectively, and are employed as already previously stated for illuminating the measuring marks M and M' fixed to the rear faces of the lenses $F_1$ and $F'_1$, respectively.

According to the mirrors $3a$ and $3'a$ and their distance from the lenses $F_1$ and $F'_1$, respectively, the marks M and M' are arranged in the rear focal points of the lenses $F_1$ and $F'_1$, respectively. The partly transparent mirrors $3a$ and $3'a$ reflect the light beams from the marks M and M' and these light beams are projected by the lenses $F_1$ and $F'_1$ into infinity of the object space. The mirrors $2a$ and $2'a$ reflect the light beams from the measuring marks again so that the same together with the light beams coming from the target are directed into the eyes of the observer looking into the oculars O and O'.

The mentioned prism combination 3, 3' is rotatably supported on a plate 9 and is pivotal about an axis 3" which is disposed perpendicularly to the longitudinal axis of the housing 1 and to the line of sight. The rotative adjustment of the prism combination 3, 3' together with the objectives $F_2$ and $F'_2$ thereon takes place by means of a micrometer knob 10 which is operatively connected with a drive shaft extending from the housing 1. By rotatively adjusting the prism combination 3, 3' the partly transparent mirrors $3a$ and $3'a$ are inclined a certain angle. The light beams from the marks M, M' which are reflected by said mirrors are therefore inclined with respect to the light beams coming from the target. This means that the light beams from the marks are directed towards the oculars O and O' in a direction which is inclined with respect to the light beams coming from the target. The angle between the light beams coming from the marks and the light beams coming from the target is the lead angle. Therefore, the lead angle is adjusted by a rotative adjustment of the prism combination 3, 3'. This angle may be read on the micrometer knob 10. An adjusting device 11 is secured to the lower portion of the plate 9 and serves for the adjustment of the initial position of the prism combination 3, 3'.

What we claim is:

1. A rangefinder comprising a longitudinal housing, two telescope systems, each of which including a triangular reflecting prism for introducing beams of light coming from the target and entering said housing, an objective lens carrying a measuring mark, and an eyepiece, said objective lenses being arranged a fixed distance apart and each in the end portions of said housing, said reflecting prisms being arranged in front of their respective objective lenses and having each a partly transparent mirror on the face adjacent their respective objectives, an observation tube extending transversely of said housing between the ends thereof, said eyepieces being arranged in the end of said tube in spaced apart relation for binocular use, two fixed reflecting prisms arranged in said housing in the space between said objective lenses for deflecting the rays from the objective lenses into the transverse observation tube in the form of two light beams having parallel axes, each light beam being directed to a respective eyepiece, a reflection prism combination comprising an orthorhombic prism and a rectangular prism disposed between said two objectives and with their bases arranged perpendicular to said imaginary axis, two partly transparent mirrors disposed on said bases and located rearwardly of the respective objectives a distance equal to one half of the focal length of said objectives, said mirrors reflecting the light beams coming from said marks, said reflection prism combination being arranged to be rotatably adjustable about a pivot axis disposed perpendicular to a plane containing the axis extending between said two objective lenses and forming the base of said rangefinder and the two parallel axes of said two light beams in said observation tube, and manually operable means for rotatably adjusting said reflection prism combination about said last named pivot axis for adjusting the lead angle desired.

2. A rangefinder according to claim 1, including two dispersion lenses, one of said lenses being attached to one of said partly transparent mirrors and the other one of said lenses being attached to the other one of said mirrors.

References Cited

UNITED STATES PATENTS

| | | | |
|---|---|---|---|
| 2,932,234 | 4/1960 | Gunther | 88—2.7 |
| 3,194,108 | 7/1965 | Gunther | 88—2.7 |

RONALD L. WIBERT, *Primary Examiner.*

ORVILLE B. CHEW II, *Assistant Examiner.*

U.S. Cl. X.R.

356—16